(12) United States Patent
Kroyan et al.

(10) Patent No.: US 7,523,429 B2
(45) Date of Patent: Apr. 21, 2009

(54) SYSTEM FOR DESIGNING INTEGRATED CIRCUITS WITH ENHANCED MANUFACTURABILITY

(75) Inventors: Armen Kroyan, San Francisco, CA (US); Youping Zhang, Fremont, CA (US); Etsuya Morita, Dublin, CA (US); Adrianus Ligtenberg, Los Altos Hills, CA (US)

(73) Assignee: Takumi Technology Corporation, Santa Clara, CA (US)

( * ) Notice: Subject to any disclaimer, the term of this patent is extended or adjusted under 35 U.S.C. 154(b) by 543 days.

(21) Appl. No.: 11/060,927

(22) Filed: Feb. 18, 2005

(65) Prior Publication Data

US 2005/0188338 A1    Aug. 25, 2005

Related U.S. Application Data

(60) Provisional application No. 60/546,375, filed on Feb. 20, 2004, provisional application No. 60/546,530, filed on Feb. 20, 2004, provisional application No. 60/546,558, filed on Feb. 20, 2004.

(51) Int. Cl.
*G06F 17/50* (2006.01)
(52) U.S. Cl. .......................... 716/9; 716/10
(58) Field of Classification Search ............. 716/9, 716/10
See application file for complete search history.

(56) References Cited

U.S. PATENT DOCUMENTS

| | | | |
|---|---|---|---|
| 5,920,487 A * | 7/1999 | Reich et al. | |
| 6,745,372 B2 * | 6/2004 | Cote et al. | 716/2 |
| 7,363,099 B2 * | 4/2008 | Smith et al. | 700/121 |
| 2002/0073394 A1 * | 6/2002 | Milor et al. | |
| 2002/0138813 A1 * | 9/2002 | Teh et al. | |
| 2003/0200513 A1 * | 10/2003 | Bergman Reuter et al. | |
| 2004/0003357 A1 * | 1/2004 | Palusinski et al. | |
| 2005/0268256 A1 * | 12/2005 | Tsai et al. | 716/4 |

* cited by examiner

*Primary Examiner*—Jack Chiang
*Assistant Examiner*—Brandon W Bowers
(74) *Attorney, Agent, or Firm*—Hall Estill; William C. Milks, III

(57) ABSTRACT

A system and method for integrated circuit design are disclosed to enhance manufacturability of circuit layouts through generation of hierarchical design rules which capture localized layout requirements. In contrast to conventional techniques which apply global design rules, the disclosed IC design system and method partition the original design layout into a desired level of granularity based on specified layout and integrated circuit properties. At that localized level, the design rules are adjusted appropriately to capture the critical aspects from a manufacturability standpoint. These adjusted design rules are then used to perform localized layout manipulation and mask data conversion.

76 Claims, 10 Drawing Sheets

SYSTEM FOR DESIGNING INTEGRATED CIRCUITS WITH ENHANCED MANUFACTURABILITY

CROSS-REFERENCES TO RELATED PATENT APPLICATIONS

This application relates to U.S. Provisional Patent Application No. 60/546,375, filed on Feb. 20, 2004, entitled SYSTEM FOR DESIGNING INTEGRATED CIRCUITS WITH ENHANCED MANUFACTURABILITY; U.S. Provisional Patent Application No. 60/546,530, filed on Feb. 20, 2004, entitled SYSTEM FOR RESOLUTION ENHANCEMENT TECHNIQUE IMPLEMENTATION FLOW; and U.S. Provisional Patent Application No. 60/546,558, filed on Feb. 20, 2004, entitled SYSTEM FOR LAYOUT MANUFACTURABILITY ENHANCEMENT.

BACKGROUND OF THE INVENTION

1. Field of the Invention

The present invention relates generally to a system and method for designing integrated circuits fabricated by a semiconductor manufacturing process and, more particularly, to a system and method for designing integrated circuits to enhance manufacturability and, hence, yield of a semiconductor fabrication process used to produce the integrated circuits.

2. Description of the Prior Art

The semiconductor manufacturing industry is continually evolving semiconductor designs and fabrication processes and developing new processes to produce smaller and smaller geometries of the designs being manufactured, because smaller semiconductor devices typically consume less power, generate less heat, and operate at higher speeds than larger devices. Currently, a single integrated circuit chip may contain over one billion patterns. Consequently, integrated circuit designs and semiconductor fabrication processes are extremely complex, since hundreds of processing steps may be involved. Occurrence of a mistake or small error at any of the design or process steps may necessitate redesign or cause lower yield in the final semiconductor product, where yield may be defined as the number of functional devices produced by the process as compared to the theoretical number of devices that could be produced assuming no bad devices.

Improving time-to-market and yield is a critical problem in the semiconductor manufacturing industry and has a direct economic impact on the semiconductor industry. In particular, a reduced time-to-market and higher yield translate into earlier availability and more devices that may be sold by the manufacturer.

Semiconductor integrated circuit (IC) design and manufacturing processes have become increasingly challenging with each new technology node. Classically, the communication of IC requirements between design and manufacturing has been enabled through a set of global and comprehensive design rules. However, with the emergence of sub-wavelength photolithography, the nonlinearity of the pattern transfer process onto semiconductor material such as silicon has increased dramatically. Due to this phenomenon, the effectiveness of the conventional IC design methodology has been significantly decreasing.

The traditional global design rule approach suffers from the following paradox between IC layout density and manufacturability. To achieve tighter designs, the design rules need to be as aggressive as possible, while wafer manufacturing is enabled using complicated sub-wavelength technology. This creates more and more manufacturability problems. For example, 65 nm design rules call for a much smaller feature size and pattern pitch than 90 nm design rules, whereas the pattern resolution improvement from manufacturing equipment expected for 65 nm technology is somewhat limited. To alleviate printability problems of some "difficult" layout patterns, it is sometimes necessary to relax design dimensions, which translates into more relaxed global design rules for physical layout synthesis. Subsequently, this results in loss of density.

Considered in more detail, FIG. 1 illustrates typical design and manufacturability trade-offs. In FIG. 1(a), the horizontal axis 101 is the density/manufacturability axis, in which moving to the left means lower pattern density but better manufacturability, and moving to the right means higher pattern density but poorer manufacturability. The vertical axis 102 is the distribution of patterns for a design. The threshold 103 marks the boundary for manufacturability problems, and 104 marks the boundary for potential density improvements. The area between the two thresholds 103 and 104 is where acceptable compromises between design and manufacturing are achieved.

As shown in FIG. 1(a), the distribution curve 105 represents a typical design associated with an aggressive design rule, where although most of the design patterns 106 fall into good compromise areas, a significant portion of the design will potentially have manufacturability problems, as indicated by the shaded area 107. Conversely, the area 108, that allows design improvements, is minimal, because the design rules used are already aggressive.

On the other hand, the distribution 109 shows a typical design with relaxed design rules. As can be seen, the manufacturability problems are minimized, but the design is not optimized in terms of density, and there is opportunity for design improvement. As an outcome, such a design may not meet the targeted chip size.

However, well-balanced design rules would result in a well-centered curve, as shown in FIG. 1(b), in which the distribution is more even between good manufacturability and design density. In this case, the quality threshold is determined based on a distribution where the total area of the design that has potential manufacturability problems is smaller than a certain predetermined value (e.g., 0, which means no manufacturability problem is allowed). The distance between the quality threshold and the manufacturability threshold is referred to as "process margin."

One approach that the semiconductor industry is pursuing is to incorporate manufacturability check or verification, primarily photolithography related, into the front-end design. Manufacturability is verified during physical layout creation, which attempts to eliminate potential manufacturing difficulty in the final design tape-out.

While potentially preventing the problem at the back-end, this front-end design approach has many drawbacks. These drawbacks include the following:

1. A front-end oriented technique essentially interrupts the current front-end design flow, which is well-established for many IC designers. The disturbance to the existing flow is even more severe when encountering a tightly integrated logic/high level synthesis, physical design, and timing verification flow. In addition, the front-end design flow is already complex enough due to the difficulty in getting timing closure. The introduction of additional constraints (i.e., manufacturability) can potentially introduce even more complex flows and more design iterations.

2. It requires extensive tool support and integration from the currently well-established and mature design tools.

3. It requires knowledge and expertise in manufacturing processes, which the front-end designers typically lack.

4. Most of all, the front-end oriented approach requires a paradigm shift from the traditional "throw-over-the-wall" approach and requires a much more extensive and frequent feedback from manufacturing to the design side. This may potentially increase product time-to-market.

Thus, it would be desirable to provide an IC design system and method which overcome the above limitations and disadvantages of conventional systems and techniques and facilitate IC designs having improved manufacturability. It is to this end that the present invention is directed. The various embodiments of the present invention provide many advantages over conventional IC design methods and systems.

SUMMARY OF THE INVENTION

One embodiment of the IC design system and method in accordance with the present invention provides many advantages over conventional design systems and techniques, which make the IC design system and method in accordance with the present invention more useful to semiconductor manufacturers. One embodiment of the present invention provides a back-end methodology and a system that has as little interference with the front-end design as possible, while providing the benefit of manufacturability enhancement.

Typical design rules offer compromises of manufacturability and design aggressiveness. Generally, for a given technology node and process condition, a majority of designs offer a good layout density with sufficient manufacturing process margins. However, there may be small portions of the design that have a poor manufacturability, which limits the entire process margin (see, FIG. 1). These specific localized problems are the typical cause of circuit failures or loss of yield. On the other hand, there are also portions of the design that have a superior process margin, significantly exceeding the minimal tolerance of the manufacturing process. It is therefore possible to locally optimize manufacturability of difficult patterns without over-specifying the global design rules and the overall process tolerance.

Accordingly, one embodiment of the IC design system and method in accordance with the present invention provides a localization of design rules. The method and system for IC design in accordance with one embodiment of the present invention enhance manufacturability of circuit layouts through generation of hierarchical design rules which capture localized layout requirements. In contrast to conventional techniques which apply global design rules, one embodiment of the IC design system and method in accordance with the present invention partitions the original design layout into a desired level of granularity based on specified layout/IC properties. At that localized level, the design rules are adjusted appropriately to capture the critical aspects from a manufacturability standpoint. These adjusted design rules are then used to perform localized layout manipulation and mask data conversion.

Additionally, one embodiment of the present invention comprises a system and method for providing a resolution enhancement technique (RET) for integrated circuit designs to enhance manufacturability, that locally optimize manufacturability of difficult patterns by applying RET to partitions of the design layout. Accordingly, one embodiment of the IC design system and method for providing RET in accordance with the present invention partitions the refined design layout into a desired level of granularity based on specified layout/IC properties. At that localized level, RET is applied to manipulate the layout based on the critical aspects from a manufacturability standpoint.

In addition, one embodiment of the present invention comprises a system and method for providing layout manufacturability enhancement for integrated circuit designs to enhance manufacturability, for example, to optimize manufacturability of the design layout in a manner that resolves problems due to identifiable "weak spots." The IC design system and method for providing layout manufacturability enhancement in accordance with the present invention enhance the manufacturability of IC layouts though utilization of an intelligent capability of localized pattern optimization based on the critical aspects from a manufacturability standpoint. The layout manufacturability enhancement IC design system and method may be employed at different stages of the IC design flow leading to design tape-out. For example, the input layout may be comprised of the full layout or only a portion of the layout such as a functional block, standard cell, localized partition, etc. The manufacturability-optimized output layout may then be input back into the IC design flow leading to a mask tape-out.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing:

FIGS. 5(a) and 5(b), illustrates an example of geometrically similar localized random logic patterns which require different design rules;

DETAILED DESCRIPTION OF THE PREFERRED EMBODIMENTS

The present invention is particularly applicable to a computer-implemented software-based IC design system, and it is in this context that the various embodiments of the present invention will be described. It will be appreciated, however, that the IC design system and method in accordance with the present invention have greater utility, since they may be implemented in hardware or may incorporate other modules or functionality not described herein.

Figure 2:
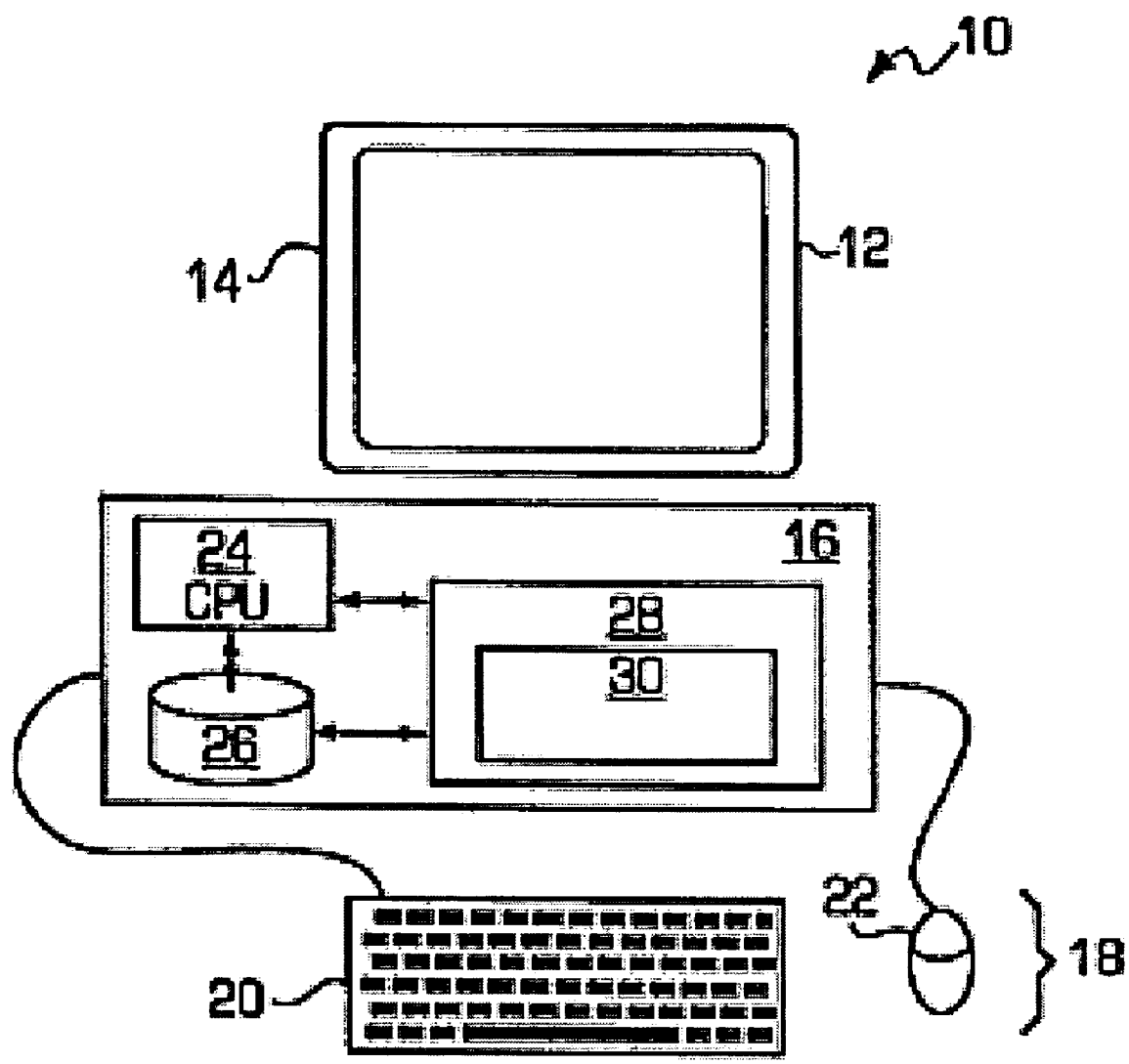
FIG. 2 is a block diagram illustrating an example of an IC design system in accordance with one embodiment of the present invention.

FIG. 2 is a block diagram illustrating an example of an IC design system 10 in accordance with one embodiment of the present invention implemented on a personal computer 12. In particular, the personal computer 12 may include a display unit 14, which may be a cathode ray tube (CRT), a liquid crystal display, or the like; a processing unit 16; and one or more input/output devices 18 that permit a user to interact with the software application being executed by the personal computer. In the illustrated example, the input/output devices 18 may include a keyboard 20 and a mouse 22, but may also include other peripheral devices, such as printers, scanners, and the like. The processing unit 16 may further include a central processing unit (CPU) 24, a persistent storage device 26, such as a hard disk, a tape drive, an optical disk system, a removable disk system, or the like, and a memory 28. The CPU 24 may control the persistent storage device 26 and memory 28. Typically, a software application may be permanently stored in the persistent storage device 26 and then may be loaded into the memory 28 when the software application is to be executed by the CPU 24. In the example shown, the memory 28 may contain an IC design tool 30. The IC design tool 30 may be implemented as one or more software modules that are executed by the CPU 24.

In accordance with the present invention, the IC design system 10 may also be implemented using hardware and may be implemented on different types of computer systems, such as client/server systems, Web servers, mainframe computers, workstations, and the like. Now, more details of an exemplary implementation of the IC design system 10 in software will be described.

One embodiment of the present invention provides an IC design method for processing a design tape-out, e.g., a GDS or OASIS file or a file having another format. Design tape-out typically undergoes rigorous timing verification, and, hence, it is desirable to make as little modification as possible to the layout intent to ensure minimum disturbance of timing factors.

Figure 3:
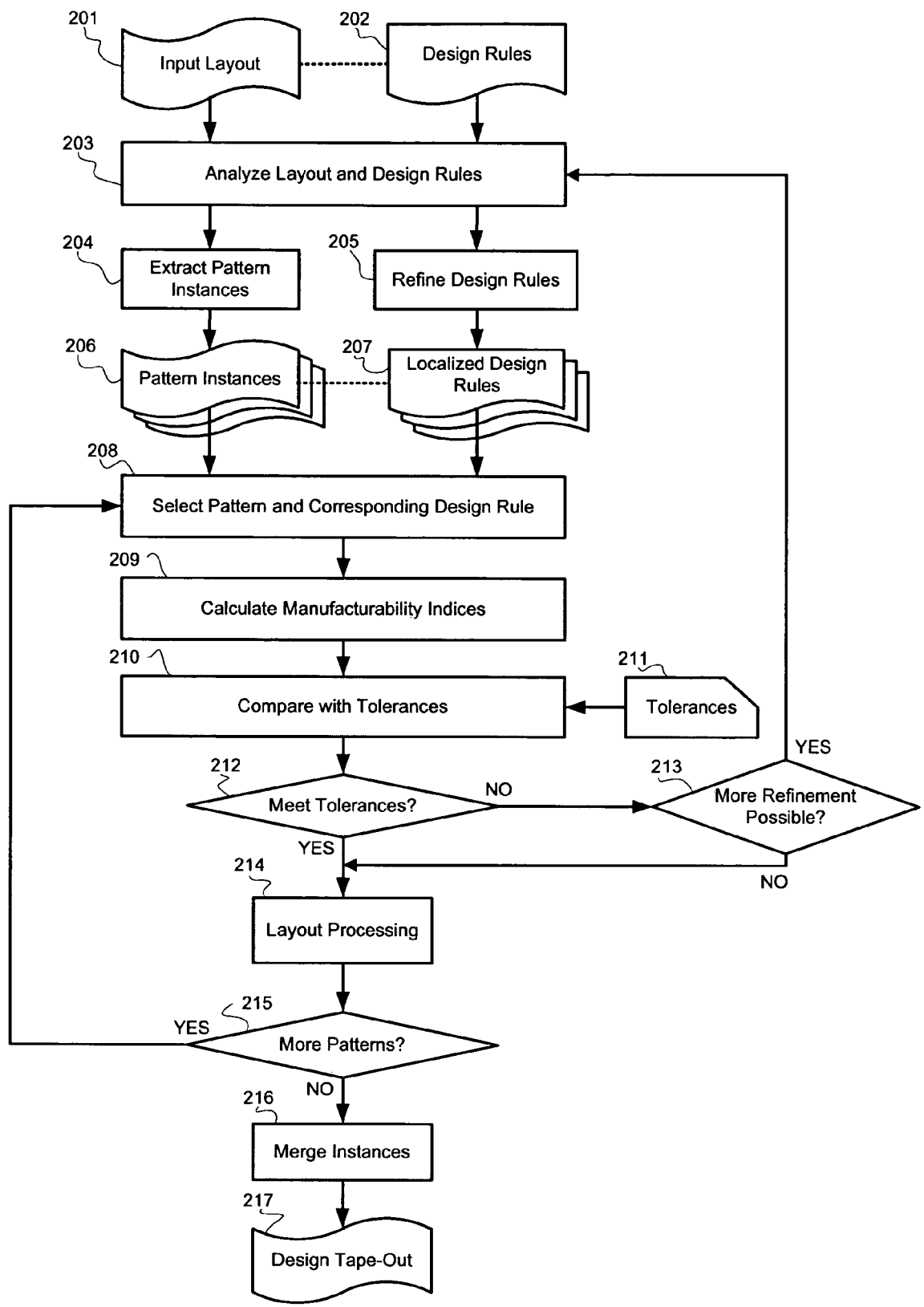
FIG. 3 is a flow diagram illustrating the method for IC design in accordance with one embodiment of the present invention.

FIG. 3 is a flowchart of one embodiment of the IC design method in accordance with the present invention. In a step 203, an input layout 201 and associated design rules 202 are input into an analysis engine which evaluates the layout and the design rules. The design rules may include any preferred design rules to be applied to the input layout 201. For example, these preferred design rules may be refined design rules based on experience with the particular semiconductor manufacturing process to be utilized.

The analysis process performed by the analysis engine 203 determines distinct pattern types which, although resulting from the same design rules, have different criticality leading to different manufacturability margin requirements. For pattern types with little or no manufacturability margin, it may be necessary to relax the design rules to increase the manufacturability margin, whereas for pattern types with excess manufacturability margin, it may be possible to tighten or compact the design. Accordingly, a new set of "refined" design rules emerges in association with each pattern type. Preferably, refinement of the design rules provides design rule shifts only when necessary, and the changes are as small as possible to minimize effects on timing.

In a step 204 shown in FIG. 3, the pattern instances 206 are extracted. Similarly, through a design rule refinement step 205, localized design rules 207 are produced corresponding to each pattern instance identified in step 206. In a step 208, each pattern instance and localized design rule pair is selected and then processed by a step 209 for an evaluation of the manufacturability indices. Manufacturability indices are one or more quantitative or qualitative values which evaluate the manufacturability versus design optimization (i.e., density and feature dimension) tradeoff. Manufacturability indices that meet the tolerances indicate a well-balanced manufacturability and design optimization. Otherwise, the design needs to be sub-divided and re-balanced.

In a step 210, the outcome results are compared against preset tolerances input in a step 211. In a step 212, if it is determined that the values are within the tolerances, it means that the selected design rule is suitable for the given pattern instance. Then, the process moves to a step 214 for layout processing according to these design rules. Otherwise, more refinement may be needed. For that purpose, a decision step 213 is performed to ascertain whether further refinement is possible. If so, the method returns to the step 203 for a further analysis and pattern/design rule refinement.

Once the method determines that a pattern cannot be further refined in the step 213, the layout processing step 214 is performed with the current selected design rules. After the layout processing step 214, the method looks for more pattern instances in a step 215 and, if necessary, selects a new pattern to process. Step 215 may comprise a variety of verification steps including, but not limited to, printability and parasitic extraction analysis.

After all pattern instances are processed, the method merges all of the resultant patterns in a step 216. Finally, the new design is output in a step 217.

Figure 1:
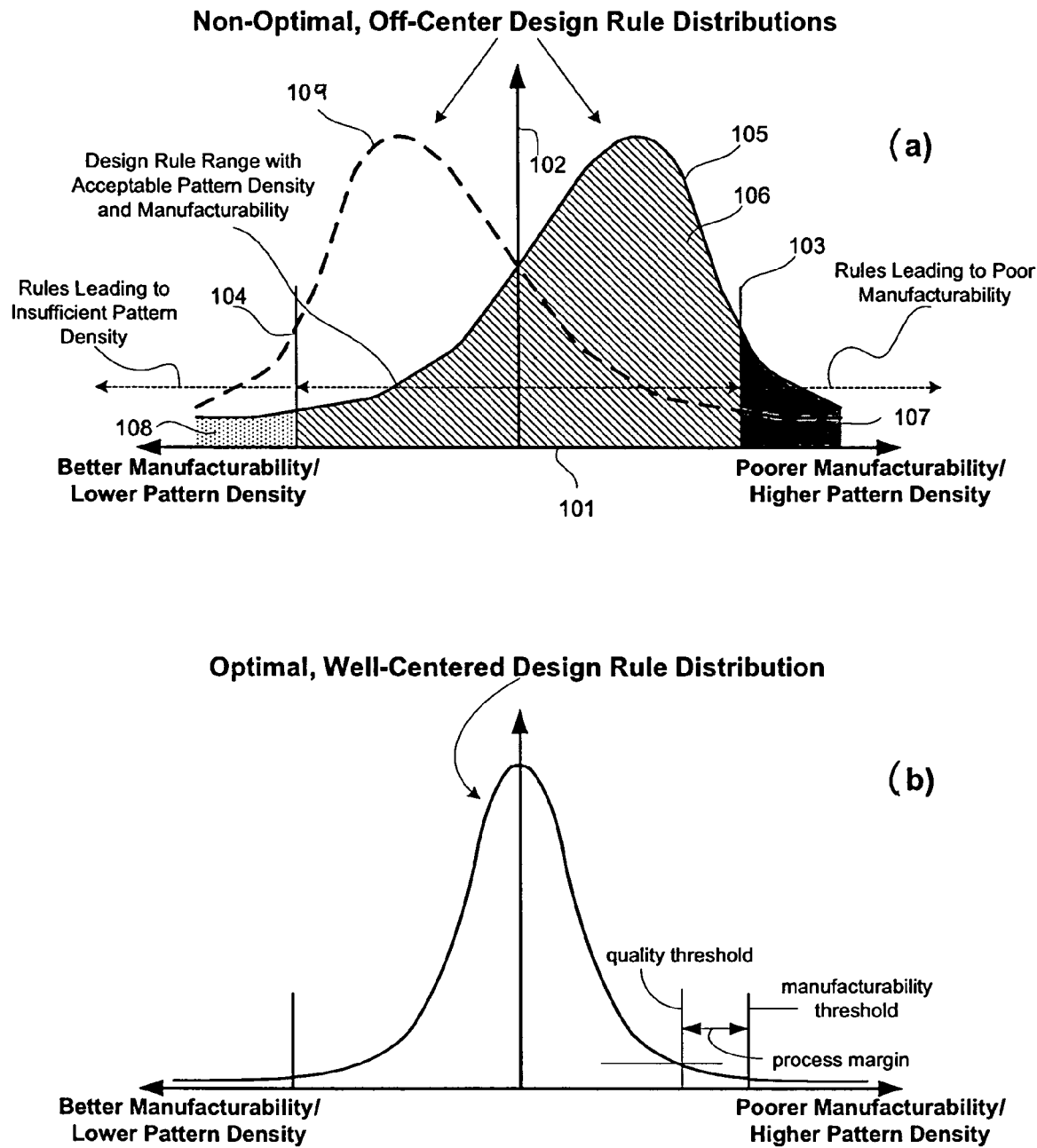
FIG. 1 is a diagram illustrating examples of potentially problematic, off-center design rules (a) and a well-centered rule distribution (b), optimized for design density and manufacturability.
Figure 4:
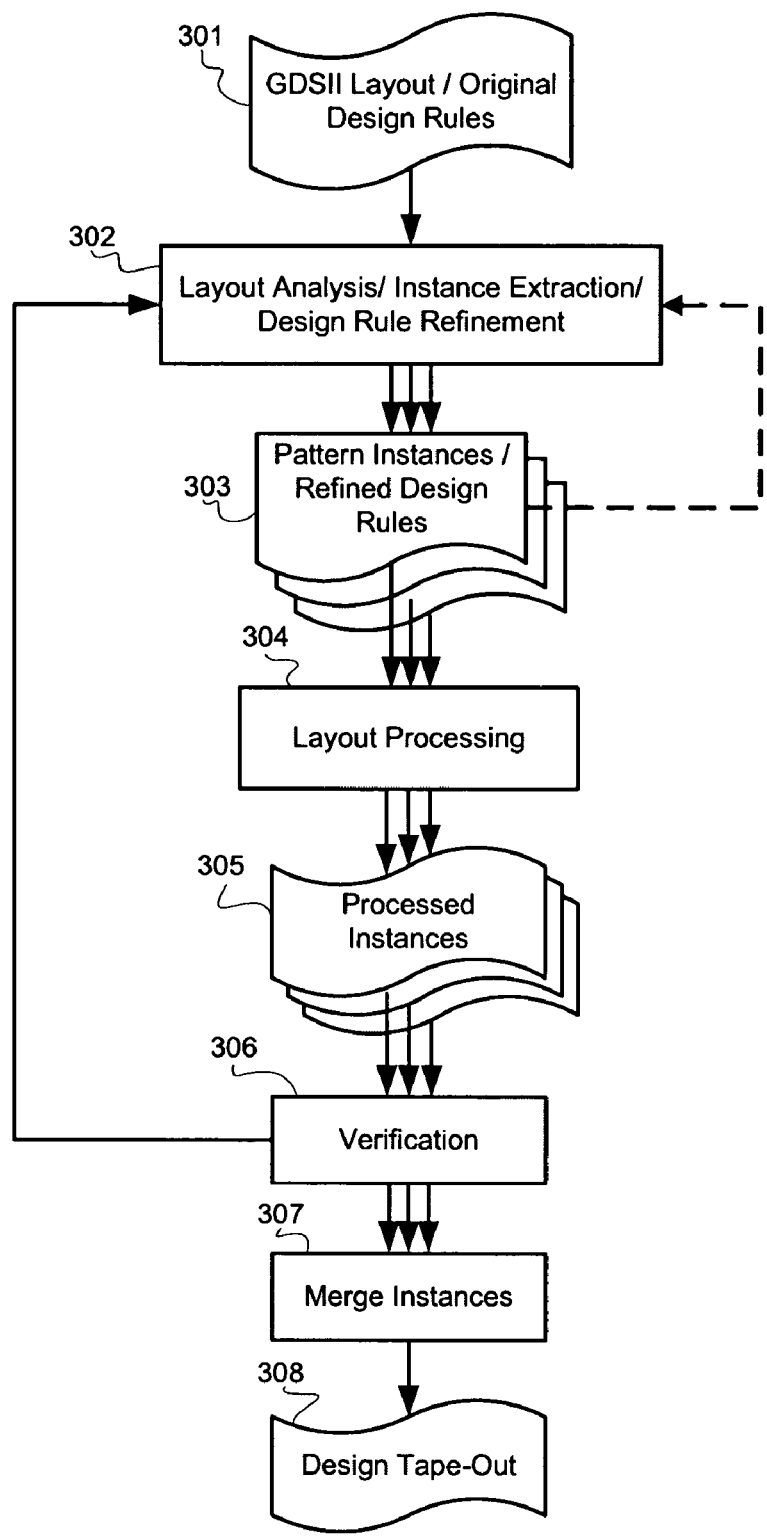
FIG. 4 illustrates an example of a typical data flow for the method for IC design in accordance with one embodiment of the present invention.

The IC design method in accordance with the embodiment of the present invention shown in FIG. 3 may be illustrated with an example, as shown in FIG. 4. The method starts with a design GDSII tape-out 301. This design is associated with a baseline design rule which is used in the physical layout generation process. The layout undergoes a first analyzing process 302, which studies the whole layout and extracts a first level of layout characteristics that influence manufacturability. Such characteristics separate the layout into several categories, within each of which a slight shift of the design rule may re-center the manufacturability curve (see FIG. 1) so that the overall process margin can be increased. This leads to a first level of "design rule refinement" based on the upstream design rule with a slight modification that improves manufacturability. Each category of pattern instances 303 may be viewed as a new design with a new set of design rules.

As shown in FIG. 4, the design can undergo a further refinement according to the second level of layout characteristics which have manufacturability importance. Then, a second level of categorization may be obtained, along with a second level of design rule refinement, which may result in further process margin improvement.

This creates a hierarchy of layout categories and design rules where the manufacturing margin builds in deeper into the hierarchy. The refinement preferably stops when the pattern sub-category meets the manufacturing margin or, alternatively, when the IC design method determines that no further refinement is possible. When the refinement process is completed, all patterns within each sub-category are extracted and passed through a layout processing engine in a step 304. The layout processing engine adjusts the layout patterns so that the manufactured patterns meet the design intent within specified tolerances. The outputs 305 from the layout processing engine comprise processed patterns within each sub-category and are subjected to a verification process in a step 306 to ensure that processed layout instances meet printability and electrical performance margins. If a given pattern instance does not pass through the step 306, then it is sent back to the analysis step 302 and is subjected to further reprocessing. Finally, the output layout instances are merged in the step 307, which produces the final layout in a step 308.

The layout analysis engine preferably uses certain layout characteristics that have manufacturability importance for characterization. The following are examples of such characteristics:

Timing criticality

Circuit type: logic, memory, standard cells, peripherals, etc.

Device type

Feature types: transistor gates, poly interconnect, contact enclosures, transistor end cap, dummy fills, logo, etc.

Specifications and tolerances

Layers, geometrical and topological properties

Printability characteristics: placement error, contrast, MEEF, DOF, overlay error, etc.

Figure 5:
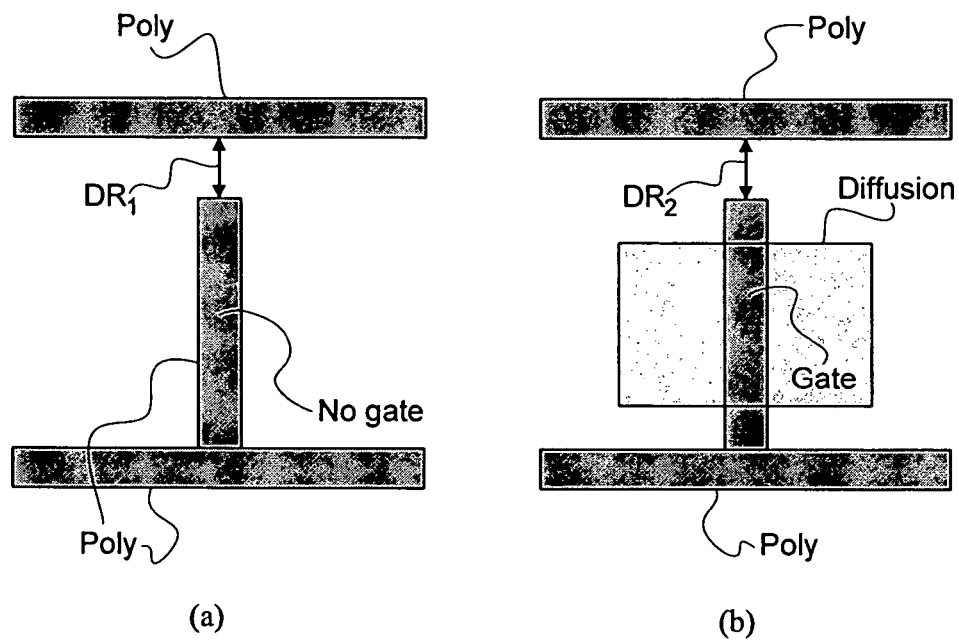
FIG. 5, comprising

FIG. 5 illustrates an example in which two geometrically similar patterns have different device properties. Due to the different device specifications, the corresponding localized design rules may be different, as well. The IC design system and method in accordance with one embodiment of the present invention locally optimize the layout manipulation process in order to achieve improved circuit manufacturability.

Figure 6:
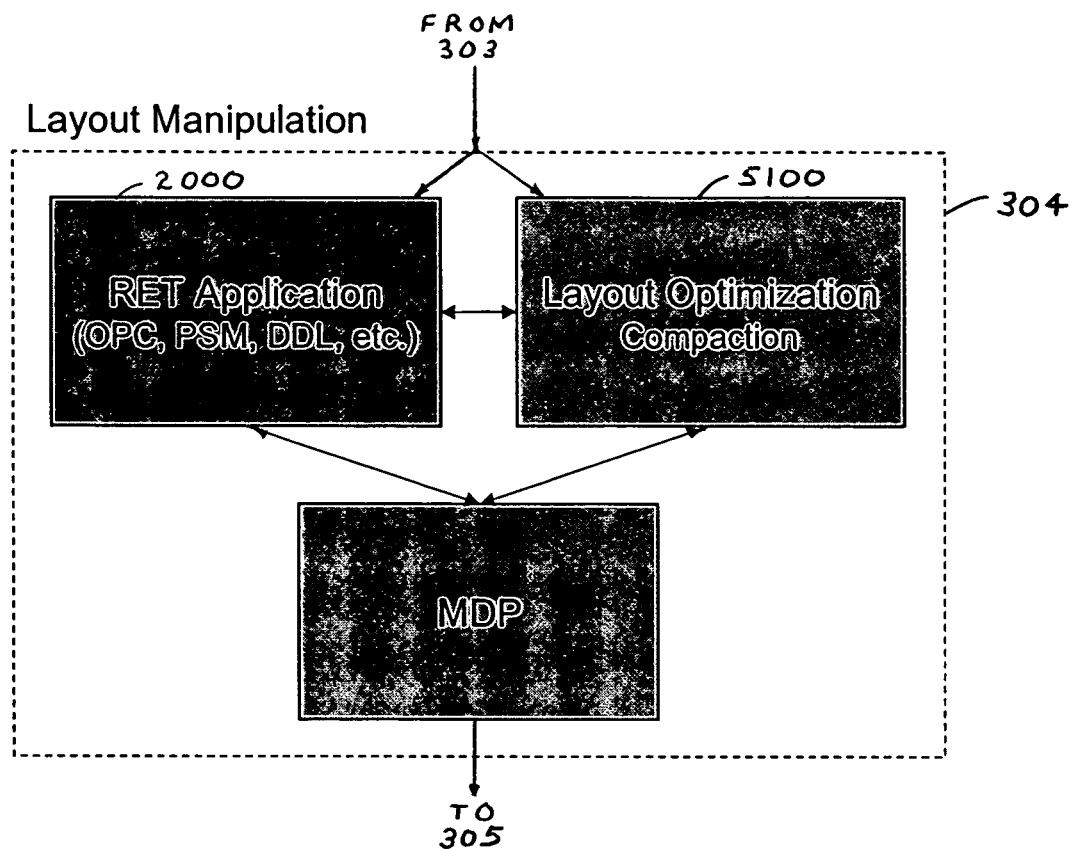
FIG. 6 is a block diagram illustrating a layout manipulation processor consisting of resolution enhancement technique (RET) application, layout optimization, and mask data preparation (MDP) process modules.

FIG. 6 shows an example of a layout manipulation processor. The layout processing engine can be a general optical proximity correction (OPC) implementation process, a complex RET flow 2000 such as a combination of phase shift mask (PSM) and OPC; a layout optimization flow 5100 based on modification and/or compaction; and, preferably, mask data preparation (MDP), for example, fracturing; or even a more complex flow containing various combinations of all of the above, as shown in FIG. 6.

By way of further background, in view of the widening gap between design and manufacturability in the sub-wavelength regime, the use of optical resolution enhancement techniques (RET) such as OPC, PSM, and off-axis illumination (OAI) are prevalent in many of the design and manufacturing schema to produce feature sizes of 0.18 µm and smaller. Moreover, as more and more resolution enhancement techniques are used, the RET implementation flow is becoming increasingly more complex and requires new and more efficient methodologies.

Figure 7:
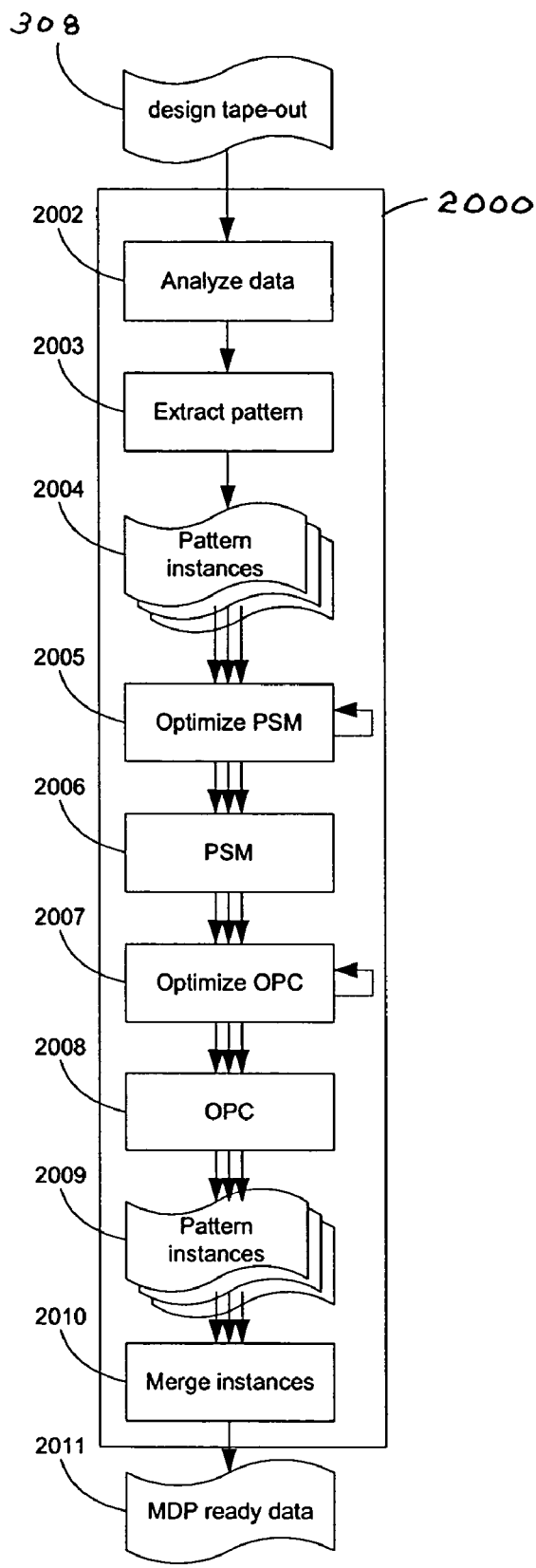
FIG. 7 is a flow diagram illustrating one embodiment of the method for RET processing in accordance with one embodiment of the present invention.

FIG. 7 is a flow diagram of the resolution enhancement technique (RET) IC design method 2000 in accordance with one embodiment of the present invention. The RET IC design method 2000 employs up-front analysis, localization, and optimization to obtain the best result for localized layout fragments, and also preferably employs a knowledge database to best capture known problematic patterns and apply the appropriate treatment.

Considered in more detail, in a step indicated by the numeral 2002 shown in FIG. 7, the layout data for a given IC design is analyzed. For example, the data may be in the form of GDSII. The analysis performed by the step 2002 sorts the data into a union of sets of "patterns." For the purposes of this description, patterns here refer to cell structures, functional blocks, device units, geometry clusters, geometric shapes with certain dimensional properties, shape interactions, layer markers, or even user specified areas, for example.

Following the analysis step 2002, a step 2003 extracts patterns and builds the associated pattern instances in a step indicated by the numeral 2004 shown in FIG. 7. Next, for each of the pattern instances, a step 2005 optimizes a PSM procedure based on the pattern category, and creates set-up parameters. This parameter set is then applied to all instances of the pattern category in a step indicated by the numeral 2006 shown in FIG. 7.

Subsequently, in a step indicated by the numeral 2007 shown in FIG. 7, an OPC procedure is optimized for each pattern category, and the resulting parameters are used in the OPC procedure for all instances in this category in a step indicated by the numeral 2008 shown in FIG. 7. As shown in FIG. 7, the optimization steps 2005 and 2007 may need to undergo several iterations to achieve best results in subsequent processing. It is to be noted that between steps 2006 and 2007, it is contemplated to apply a reassessment step if the localized patterns for PSM and OPC do not exactly match.

Then, as shown in FIG. 7, each of the processed pattern instances 2009 is processed with the parameters best suited for that pattern. Finally, in a step 2010, all of the processed pattern instances are merged, and MDP-ready layout data 2011 is produced.

The analysis step 2002 shown in FIG. 7 is a critical module in the flow to ensure a successful procedure. In accordance with a preferred embodiment of the present invention, the analysis may comprise the steps shown in FIG. 8.

Figure 8:
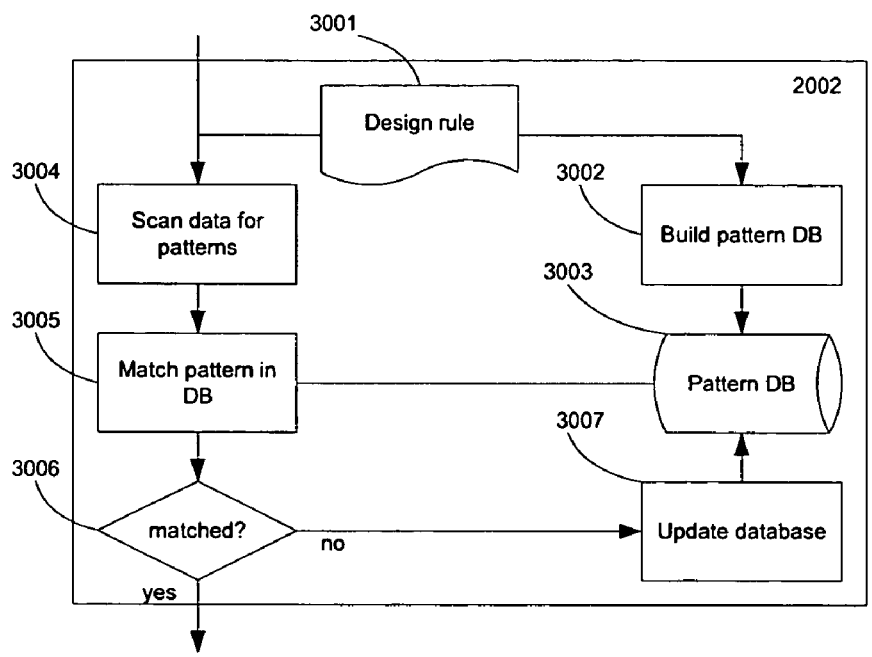
FIG. 8 is a flow diagram of one implementation of the data analysis step shown in FIG. 7 in accordance with a preferred embodiment of the present invention.

As shown in FIG. 8, first, a design rule 3001 associated with the input layout is used in a step 3002 to build a pattern database 3003. The pattern database 3003 contains a comprehensive list of geometrical features and interactions that result from a design that may require special treatment. Once this pattern database has been built, a scanning process 3004 evaluates the input layout and attempts to find matches in the database in a step indicated by the numeral 3005 shown in FIG. 8. If a match is not found in a step 3006, a database update step 3007 is invoked. The pattern database 3003 can then be re-used later for other IC designs employing the same design rules.

Figure 9:
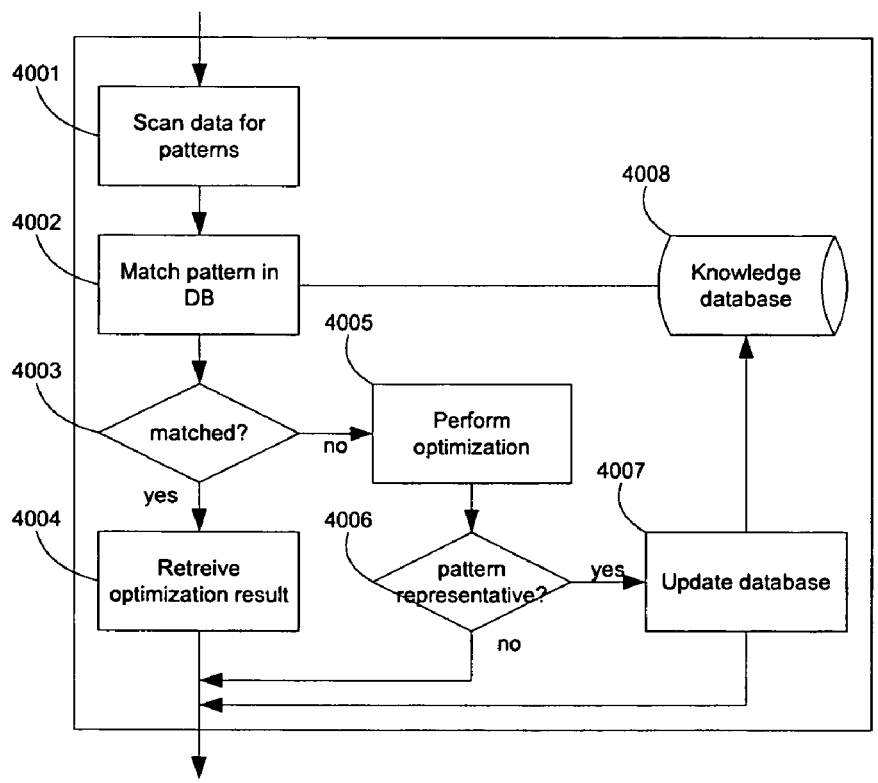
FIG. 9 is a flow diagram illustrating an intelligent analysis and optimization RET procedure in accordance with an alternative embodiment of the present invention.

Referring now to FIG. 9, an alternative embodiment of the flow shown in FIG. 7 may employ an intelligence source which is referred to as a knowledge database to partially or fully replace the optimization steps 2005 through 2008 shown in FIG. 7. The knowledge database may be built based on prior knowledge and experience, detailed simulation study through comprehensive test pattern matrices, wafer data with these test patterns, or prior optimization processes, for example. The knowledge database 4008 shown in FIG. 9 stores the pattern instances and the corresponding optimization results.

Considered in more detail, as shown in FIG. 9, the input design layout is first scanned in a step 4001, and the output layout patterns are compared against the data stored in the database 4008 in a step indicated by the numeral 4002 shown in FIG. 9. If a match is found in a step indicated by the numeral 4003 shown in FIG. 9, the optimized result is retrieved in a step 4004. Otherwise, an online optimization step 4005, similar to the procedure performed in step 2005 or 2007 shown in FIG. 7, is invoked. Then, in a step 4006, the procedure decides whether or not to store the result in the database. If the result is stored, then a database updating step 4007 is performed, which updates the database 4008. As a result, an optimization output is obtained and may be directly passed to the corresponding RET engine (PSM or OPC).

Figure 10:
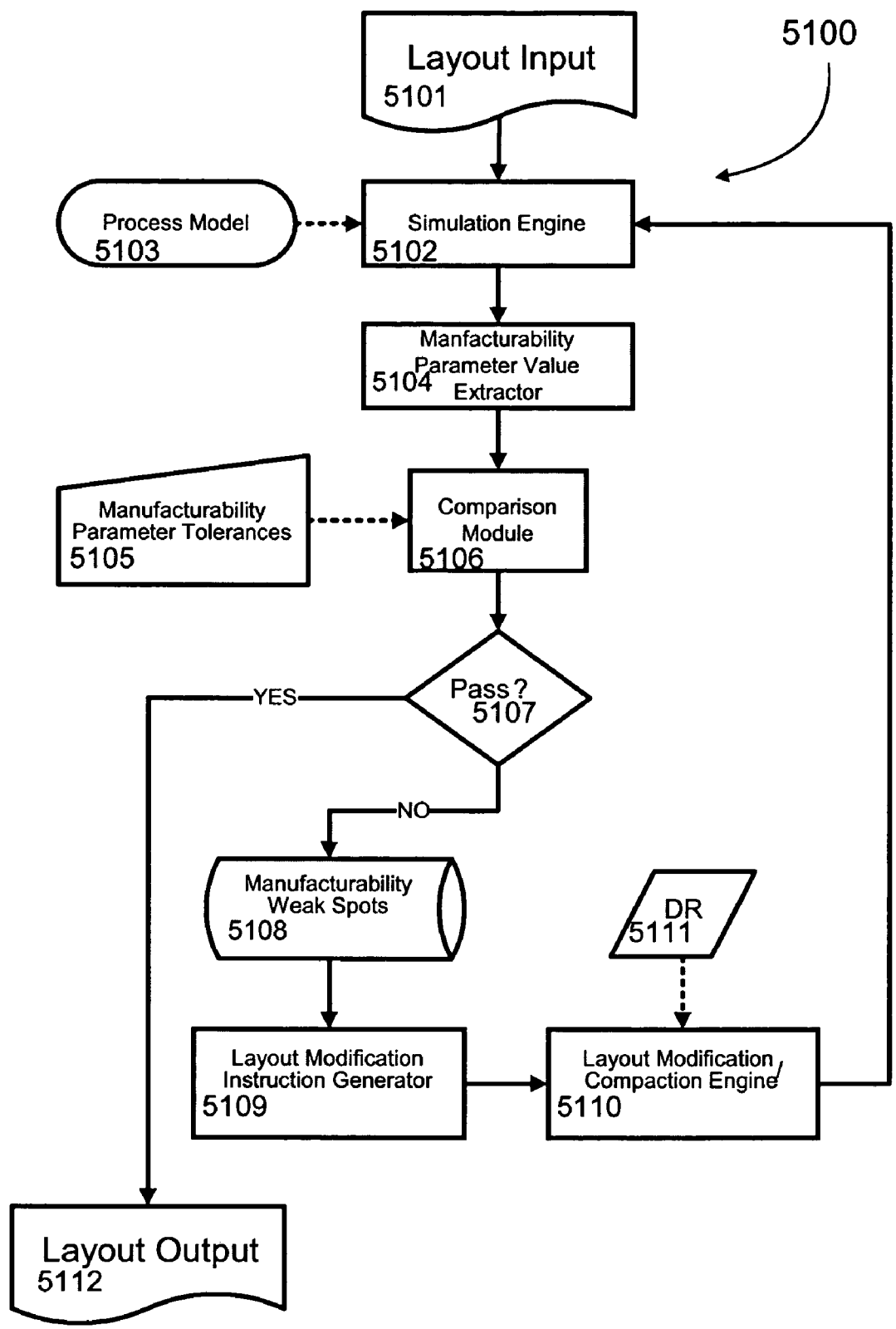
FIG. 10 is a block diagram of a preferred embodiment of a layout manufacturability enhancement system in accordance with the present invention.

FIG. 10 is a block diagram of one embodiment of the layout manufacturing enhancement for an IC design system to enhance the manufacturability of IC layouts though utilization of an intelligent capability of localized pattern optimization based on the critical aspects from a manufacturability standpoint. Generally, the preferred embodiment of the layout manufacturability enhancement system in accordance with the present invention, generally indicated by the numeral 5100 in FIG. 10, incorporates simulation-based layout analysis with layout modification/compaction capability. The layout manufacturability enhancement IC design system 5100 may be employed at different stages of the IC design flow leading to design tape-out. For example, an input design layout 5101 may be comprised of the full layout or only a portion of the layout such as a functional block, standard cell, localized partition, or the like, output by the RET flow 2000 shown in FIG. 6. A manufacturability-optimized output design layout 5112 may then be input back into the design flow leading to a mask tape-out.

Considered in more detail, as shown in FIG. 10, the input design layout 5101 is modeled using a simulation engine 5102 in order to predict the layout pattern configuration on a wafer. The simulation engine 5102 may utilize a process model or a set of process models 5103. The process model or set of process models 5103 provides an adequate description of the pattern transfer process for the purpose of manufacturability evaluation. For example, the description may be a basic optical model; a combination of an optical model with other physical models such as the associated photoresist process, etching, and the like; empirically calibrated process models; an immersion lithography model; an extreme UV lithography model, or the like. In many implementations, utilization of an optical model alone may be sufficient due to the dominant nature of optical effects in the pattern transfer process, while providing relative simplicity for use along with simulation speed. If the pattern transfer is non-optical, for example, in the case of electron-beam lithography, then an appropriate model that describes that process is input to the simulation engine 5102.

The output simulation results are then analyzed by a manufacturability parameter value extractor 5104 which is capable of extracting various manufacturability parameter values. For the purposes of this description, the term manufacturability parameter is a general term to describe manufacturability properties of a pattern, a set of patterns, a structure, a block, a circuit, or an entire layout. The manufacturability parameter value extractor 5104 should provide a meaningful description of the pattern transfer process, as will be understood by persons skilled in the art. The manufacturability parameters include numeric values, such as critical dimensions, image contrast, image log-slope, a mask error enhancement factor (MEEF), depth of focus (DOF), exposure latitude (EL), and the like, or more complex quantitative descriptions of manufacturability, such as process window (PW), or the like, for example. The manufacturability parameters can be evaluated at discrete evaluation points that have a user- or algorithm-specified, but otherwise arbitrary, granularity, or they may be described in other more complex quantitative terms, such as contours of printed images, intensity, image slope, or the like, for example, that sufficiently contain the pattern printability information.

As shown in FIG. 10, manufacturability parameter tolerances 5105, which specify relevant manufacturing constraints or yield targets, are input to a comparison module 5106 comprising the layout manufacturability enhancement system 5100. The tolerances may be specified by a user who is preferably experienced with the manufacturing process or, alternatively, calculated by optimization tools that automatically determine best values for these tolerances.

The comparison module 5106 performs a comparison between the extracted manufacturability parameter values input from the manufacturability parameter value extractor 5104 and the manufacturability tolerance values 5105. On the one hand, if a pass module 5107 determines that all tolerances are met across all the extracted manufacturability parameter values, then the process performed by the layout manufacturability enhancement system 5100 ends, and the output design layout 5112 is produced.

On the other hand, if the pass module 5107 determines that the comparison module 5106 detects any manufacturability parameter values to be out of tolerance, then, as shown in FIG. 10, the corresponding locations are identified as manufacturability "weak spots" and stored in a database 5108 along with the associated non-compliance properties. After all of the "weak spots" are identified and captured, they may be pre-processed and sorted within the database 5108. For example, "weak spots" may be sorted based on their properties such as violation type, geometrical or physical configuration, or the like.

As shown in FIG. 10, the layout manufacturability enhancement system 5100 further comprises a layout modification instruction generator 5109 that determines the relationship between the non-compliance properties of the "weak spots" and the localized geometrical configuration of layout patterns within a range of influence. For purposes of this description, the range of influence is the area within which the layout patterns have substantial effect on the quality of the manufacturability parameters.

The layout modification instruction generator 5109 also preferably generates layout modification instructions and rules that are input to a layout modification/compaction engine 5110 comprising the layout manufacturability enhancement system 5100. Additionally, design rules 5111 that are applied in the design of the layout 5101 are also input to the layout modification/compaction engine 5110. Based on the instructions received from the layout modification instruction generator 5109, the layout modification/compaction engine 5110 finds an optimal solution for all of the manufacturability "weak spots." For example, optimization of the layout may be performed based on the relative priorities of the received modification instructions.

After the process performed by the layout modification/compaction engine 5110 has been completed, the layout may be routed back to the simulation engine 5102 to assure that no additional "weak spots" remain. The process illustrated in FIG. 10 may continue iteratively until, for example, there are no "weak spots" remaining, or, alternatively, until a predetermined number of iterations is completed.

Figure 11:
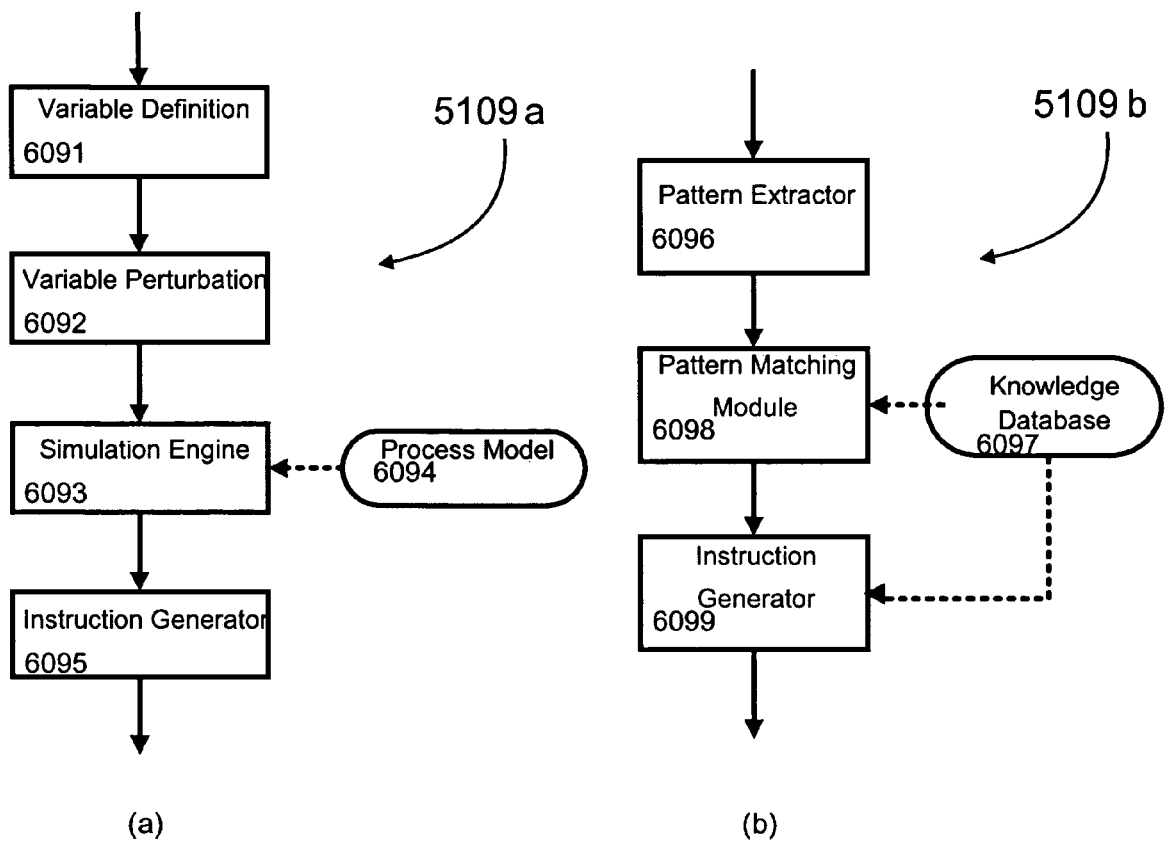
FIG. 11(a) is a block diagram of a model-based implementation of the layout modification instruction generator shown in FIG. 10 in accordance with one embodiment of the present invention.
FIG. 11(b) is a block diagram of a rule-based implementation of the layout modification instruction generator shown in FIG. 10 in accordance with another embodiment of the present invention.

FIG. 11 shows two implementations of a layout modification instruction generator 5109 in accordance with alternative embodiments of the present invention. FIG. 11(a) is a flow diagram 5109a that illustrates a model-based instruction generation system, and FIG. 11(b) is a flow diagram 5109b that illustrates a rule-based instruction generation system.

Considered in more detail, as shown in FIG. 11(a), the layout modification instruction generator 5109a comprises a variable definition module 6091 that utilizes manufacturability "weak spot" properties together with localized layout geometrical configuration data to define variables relevant to a given "weak spot." In addition, the variable definition module 6091 preferably has the capability to add assist/dummy features in sparse areas of the layout in order to optimize image interference effects.

As shown in FIG. 11(a), the layout modification instruction generator 5109a also comprises a variable perturbation module 6092 that defines variable deviation settings sufficient to establish a relationship between non-compliant manufacturability parameters and the layout variables. These settings are used by a simulation engine 6093, which calculates on-wafer representations of perturbed layouts based on a process model 6094 that is input to the simulation engine 6093. It is to be noted that simulation engines 6093 and 5102, shown in FIGS. 11(a) and 10, respectively, preferably have identical implementations, and process models 6094 and 5103, shown in FIGS. 11(a) and 10, respectively, are preferably identical. Alternatively, the simulation engines 6093 and 5102, shown in FIGS. 11(a) and 10, respectively, and process models 6094 and 5103, shown in FIGS. 11(a) and 10, respectively, may have implementations that differ.

As shown in FIG. 11(a), the layout modification instruction generator 5109a also comprises an instruction generator 6095. The instruction generator 6095 analyzes the output on-wafer patterns and calculates functional relationships between non-compliant manufacturability parameters and the layout variables.

Figure 12:
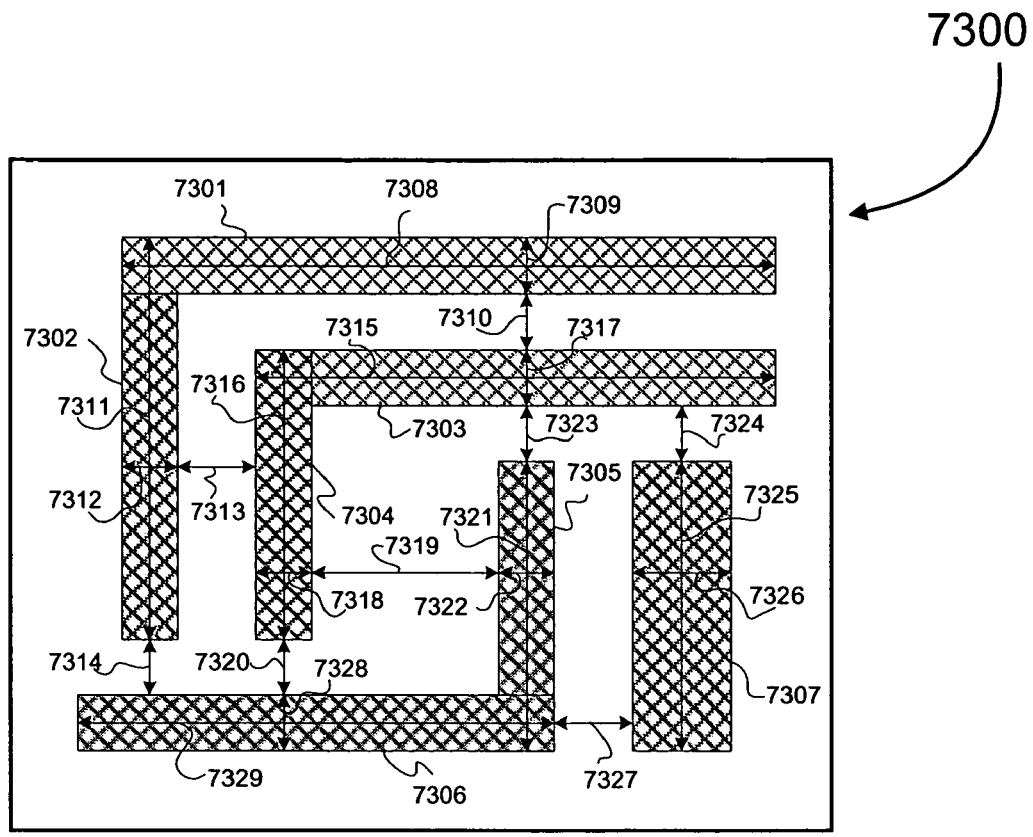
FIG. 12 illustrates an example of layout shapes and variables.

By way of example, in the operation of the embodiment of the present invention shown in FIG. 11(a), the geometrical configuration of the layout is quantified by assessment of pattern shapes and measurement of orthogonal distances of feature dimensions, spacing, gaps, pitch, and the like, as shown in FIG. 12. In FIG. 12 the numerals 7301 to 7307 define layout pattern shapes, and the numerals 7308 to 7329 define layout variables.

Figure 13:
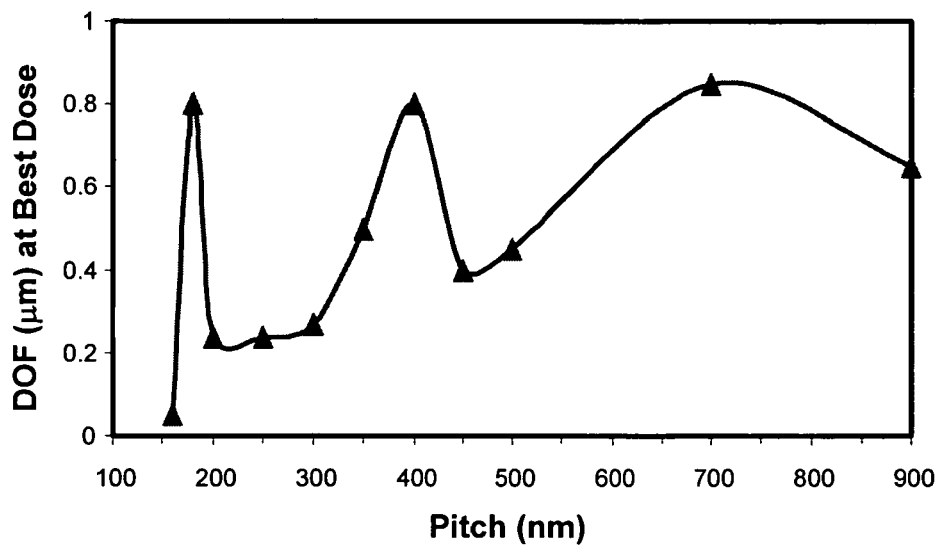
FIG. 13 is an exemplary graph illustrating a manufacturability parameter as a function of a layout variable.

By way of further example, in the operation of the embodiment of the present invention shown in FIG. 11(a), depth of focus (DOF) is used as a manufacturability parameter, and pitch is used as a layout variable, as illustrated in FIG. 13. The sensitivity of DOF at best exposure dose to pattern pitch variation is calculated via variable perturbation. Based on this calculated relationship, the instruction generator 6095 shown in FIG. 11(a) determines possible combinations of layout modification instructions that have an influence on the non-compliant manufacturability parameter, which is DOF in the present example.

Referring now to FIG. 11(b), the layout modification instruction generator 5109 shown in FIG. 10 may alternatively be implemented using a rule-based layout modification instruction generator 5109b. In the alternative implementation shown in FIG. 11(b), a pattern extractor module 6096 processes the layout, captures its localized properties, and defines the variables, similar to the example described in conjunction with FIG. 12. Based on these results, a pattern matching module 6098 then compares the output of the pattern extractor module 6096 to reference patterns stored in a previously-generated knowledge database 6097. As an example, the knowledge database 6097 may store a comprehensive set of problematic patterns and the associated remedial solutions applicable to the relevant design and manufacturing technology. These solutions may be determined either through simulation or obtained experimentally.

The pattern matching module 6098 scans through the input layout and also searches for a match in the knowledge database 6097. In the case in which a potential problem area is found, an instruction generator 6099 fetches all of the possible remedial solutions to the given problem, and creates instructions, or their logical combinations, for the layout modification/compaction engine 5110 shown in FIG. 10.

Accordingly, one advantage of the layout manufacturability enhancement IC design system and method in accordance with the present invention is that analysis of a layout is performed not only to assess compliance with manufacturability tolerances, but also to identify "weak spots." Layout optimization is then performed to remediate "weak spots" while assuring compliance with manufacturability tolerances to enhance manufacturability.

It is important to note that there is a possibility that certain "weak spots" may not have an optimal solution that would satisfy the manufacturability tolerance for a given set of constraints. In that scenario, the "weak spots" database may be further used to identify the critical layout areas for other upstream or downstream processes. For example, these critical patterns may prompt preferential treatment by RET implementation processes such as OPC, or be given special attention during mask inspection or repair, circuit testing, or yield analysis. Alternatively, this information may also prompt layout or cell redesign.

Additionally, from a practical standpoint, since the described system may use an iterative approach to converge to an optimal layout solution, the user is preferably able to specify the number of iterations or other limiting criterion to control the software operation process. In one contemplated modification of the various embodiments of the present invention, the layout modification instruction generator 5109 shown in FIG. 10 does not require manufacturability "weak spot" input. While this approach may have a limited layout optimization potential, it is faster due to the avoidance of computation intensive modules 5102 through 5108.

While the foregoing description has been with reference to particular embodiments of the present invention, it will be appreciated by those skilled in the art that changes in these embodiments may be made without departing from the principles and spirit of the invention. For example, although the method in accordance with one embodiment of the present invention has been described as a back-end solution to the manufacturing problem, it can be applied to a front-end design approach, as well. Thus, a large block of design (e.g., for a control circuit) either purchased from a third party or migrated from a previous generation can undergo the described process for optimized manufacturability and then be placed and routed with the new chip design. Accordingly, the scope of the present invention can only be ascertained with reference to the appended claims.

What is claimed is:

1. An integrated circuit design system, comprising:
means for inputting an input layout and associated design rules;
means for evaluating the input layout and the design rules;
means for producing localized design rules corresponding to identified patterns in the input layout;
means for amassing a new set of refined design rules associated with localized patterns by modifying design rules to increase manufacturability;

means for processing localized patterns based on corresponding modified design rules to produce a refined design; and means for outputting the refined design.

2. The system of claim 1, further comprising:

means for extracting pattern instances within the input layout; and means for identifying distinct pattern types which, resulting from the same design rules, have different manufacturability margins.

3. The system of claim 1 wherein the means for amassing a new set of refined design rules associated with localized patterns by modifying design rules to increase manufacturability comprises:

means for relaxing the design rules to increase the manufacturability margin for localized patterns with little or no manufacturability margin; and means for tightening or compacting the design for localized patterns with excess manufacturability margin.

4. The system of claim 1, further comprising:

means for evaluating the manufacturability index of each localized pattern and localized design rule pair to produce manufacturability index values;

means for comparing the values against preset tolerances; and means for determining that the selected design rule is suitable for the given pattern if comparison evidences that the values are within the tolerances.

5. The system of claim 1, further comprising means for merging resultant patterns derived using the refined design rules.

6. The system of claim 1, further comprising means for performing layout processing according to the refined design rules.

7. The system of claim 6, further comprising:

means for inputting layout data for the refined design;

means for analyzing the layout data to sort the layout data into a union of sets of patterns;

means for extracting patterns within the layout;

means for building associated pattern instances;

means for applying a resolution enhancement technique procedure to the pattern instances;

means for processing each of the pattern instances with at least one parameter identified for that pattern;

means for merging all of the resultant processed pattern instances to produce output layout data; and means for outputting the output layout data;

whereby the integrated circuit design has enhanced manufacturability based on localized application of resolution enhancement techniques to partitions of the refined design layout.

8. The system of claim 7 wherein the layout data is a design tape-out in the form of a GDS or OASIS file.

9. The system of claim 7 wherein the patterns are selected from among the group of patterns consisting of cell structures, functional blocks, device units, geometry clusters, geometric shapes with certain dimensional properties, shape interactions, layer markers, and user specified areas.

10. The system of claim 7 wherein the means for applying the resolution enhancement technique procedure comprises:

means for optimizing a phase shift mask procedure based on a pattern category;

means for creating setup parameters for each of the pattern instances; and means for applying the parameter set to all instances of the pattern category.

11. The system of claim 10 wherein the means for applying a resolution enhancement technique procedure comprises:

means for optimizing an optical proximity correction procedure for each pattern category; and means for applying the optical proximity correction procedure to the resulting parameters for all instances in the pattern category.

12. The system of claim 11, further comprising:

means for performing a reassessment if the localized patterns for phase shift mask and optical proximity correction do not match.

13. The system of claim 7 wherein the means for applying the resolution enhancement technique procedure comprises:

means for optimizing an optical proximity correction procedure for each pattern category; and means for applying the optical proximity correction procedure to the resulting parameters for all instances in the pattern category.

14. The system of claim 7 wherein the output data is mask-data-preparation-ready layout data.

15. The system of claim 7 wherein the means for analyzing the layout data comprises:

means for using a design rule associated with the layout data to build a pattern database containing a comprehensive list of geometrical features and interactions that result from a design that may require special treatment;

means for scanning the layout data to find matches in the database; and means for updating the database if a match is not found so that the database can be re-used later for other refined designs employing the same design rule.

16. The system of claim 7 wherein the means for applying the resolution enhancement technique procedure comprises:

a knowledge database, built based on prior knowledge and experience, detailed simulation study through comprehensive test pattern matrices, wafer data with test patterns, or prior optimization processes, to store the pattern instances and corresponding optimization results;

means for scanning the layout data;

means for comparing output layout patterns against the data stored in the knowledge database;

means for retrieving the optimized result if a match is found;

means for performing an optimization if a match is not found;

means for determining whether or not to store the performed optimization result in the knowledge database; and means for updating the knowledge database if the determination is to store the performed optimization result.

17. The system of claim 16, further comprising means for outputting the optimization to a corresponding resolution enhancement technique procedure.

18. The system of claim 17 wherein the resolution enhancement technique procedure is selected from among the group consisting of phase shift mask and optical proximity correction.

19. The system of claim 6, further comprising:

means for inputting design layout data for the refined design;

means for inputting a process model or a set of process models to provide a description of a pattern transfer process for the purpose of manufacturability evaluation;

a simulation engine to model the input design layout using the process model or set of process models in order to predict a layout pattern configuration on a wafer;

a manufacturability parameter value extractor to extract various manufacturability parameter values from the simulation model;

means for inputting manufacturability parameter tolerances to specify manufacturing constraints or yield targets;

a comparison module to perform a comparison between the extracted manufacturability parameter values and the manufacturability tolerance values;

a pass module to determine whether or not the manufacturability tolerances are met with respect to the extracted manufacturability parameter values;

a database to store corresponding locations identified as manufacturability "weak spots" along with associated non-compliance properties, if any manufacturability parameter values are detected to be out of tolerance;

a layout modification instruction generator to determine the relationship between the non-compliance properties of the "weak spots" and the localized geometrical configuration of layout patterns within a range of influence and to generate layout modification instructions and rules;

means for inputting design rules that are applied in the design of the input design layout;

a layout modification/compaction engine to find an optimal solution for the manufacturability "weak spots" based on the layout modification instructions and rules; and means for outputting an output design layout if the manufacturability tolerances are met or if a predetermined limiting criterion is met;

whereby the integrated circuit design has enhanced manufacturability.

20. The system of claim 19 wherein the input design layout data is a design tape-out in the form of a ODS or OASIS file.

21. The system of claim 19 wherein the process model or the set of process models comprises data consisting of data relating to one of the group of a basic optical model; a combination of an optical model with other physical models such as an associated photoresist process, etching, and the like; empirically calibrated process models; an immersion lithography model; an extreme UV lithography model; or a non-optical model.

22. The system of claim 19 wherein the manufacturability parameter values consist of numeric values, such as critical dimensions, image contrast, image log-slope, a mask error enhancement factor (MEEF), depth of focus (DOF), exposure latitude (EL), or more complex quantitative descriptions of manufacturability, such as a process window (PW)

23. The system of claim 22 wherein the manufacturability parameter values are evaluated at discrete evaluation points that have a user- or algorithm-specified, but otherwise arbitrary, granularity, or are described in other more complex quantitative terms, such as contours of printed images, intensity, image slope, and the like, that sufficiently contain pattern printability information.

24. The system of claim 19 wherein the manufacturability parameter tolerances are specified by a user experienced with the manufacturing process or calculated by optimization tools that automatically determine best values for the tolerances.

25. The system of claim 19, further comprising means for pre-processing and sorting "weak spots" stored within the database after the "weak spots" are identified and captured.

26. The system of claim 25 wherein "weak spots" are sorted based on their properties such as violation type or geometrical or physical configuration.

27. The system of claim 19 wherein the layout modification/compaction engine finds an optimal solution for the layout based on the relative priorities of the received modification instructions and rules.

28. The system of claim 19 wherein the layout modification instruction generator is a model-based instruction generation system comprising:

a variable definition module that utilizes manufacturability "weak spot" properties together with localized layout geometrical configuration data to define variables relevant to a given "weak spot;"

a variable perturbation module that defines variable deviation settings sufficient to establish a relationship between noncompliant manufacturability parameters and the layout variables;

a simulation engine that calculates on-wafer representations of perturbed layouts based on the process model or set of process models and the variable deviation settings; and an instruction generator to analyze the output on-wafer patterns and to calculate functional relationships between noncompliant manufacturability parameters and the layout variables.

29. The system of claim 28 wherein the variable definition module has the capability to add assist/dummy features in sparse areas of the layout in order to optimize image interference effects.

30. The system of claim 19 wherein the layout modification instruction generator is a rule-based instruction generation system comprising:

a pattern extractor module to process the input design layout, capture localized properties of the layout, and define layout variables to provide an extracted pattern;

a knowledge database to store reference patterns;

a pattern matching module to compare the extracted pattern to the reference patterns stored in the knowledge database; and an instruction generator to fetch the remedial solutions to the given problem and to create instructions, or their logical combinations, for the layout modification/compaction engine.

31. The system of claim 30 wherein the knowledge database stores a comprehensive set of problematic patterns and the associated remedial solutions applicable to the relevant design and manufacturing technology.

32. The system of claim 31 wherein the solutions are determined through simulation or obtained experimentally.

33. The system of claim 19 wherein the output design layout is input into a design flow leading to a mask tape-out.

34. The system of claim 6, further comprising:

means for inputting design layout data for the refined design;

a pattern extractor module to process the input design layout and capture localized properties of the layout;

a knowledge database to store reference patterns;

a pattern matching module to compare the extracted pattern to the reference patterns stored in the knowledge database;

an instruction generator to fetch the remedial solutions to the given problem and to create instructions, or their logical combinations;

a layout modification/compaction engine to find an optimal solution for the manufacturability based on the layout modification instructions; and means for outputting an output design layout;

whereby the integrated circuit design has enhanced manufacturability.

35. The system of claim 34 wherein the knowledge database stores a comprehensive set of problematic patterns and the associated remedial solutions applicable to the relevant design and manufacturing technology.

36. The system of claim 35 wherein the solutions are determined through simulation or obtained experimentally.

37. The system of claim 1, further comprising:
means for ascertaining whether further design rule refinement is possible; and
means for performing a further analysis and design rule refinement if it is ascertained that the design rule is susceptible to further refinement.

38. A method for designing integrated circuits, comprising the steps of:
inputting an input layout and associated design rules;
evaluating the input layout and the design rules;
producing localized design rules corresponding to identified patterns in the input layout;
amassing a new set of refined design rules associated with localized patterns by modifying design rules to increase manufacturability;
processing localized patterns based on corresponding modified design rules to produce a refined design; and
outputting the refined design.

39. The method of claim 38, further comprising the steps of:
extracting pattern instances within the input layout; and
identifying distinct pattern types which, resulting from the same design rules, have different manufacturability margins.

40. The method of claim 38 wherein the step of amassing a new set of refined design rules associated with localized patterns by modifying design rules to increase manufacturability comprises the steps of:
relaxing the design rules to increase the manufacturability margin for localized patterns with little or no manufacturability margin; and
tightening or compacting the design for localized patterns with excess manufacturability margin.

41. The method of claim 38, further comprising the steps of:
evaluating the manufacturability index of each localized pattern and localized design rule pair to produce manufacturability index values;
comparing the values against preset tolerances; and
determining that the selected design rule is suitable for the given pattern if comparison evidences that the values are within the tolerances.

42. The method of claim 38, further comprising the step of merging resultant patterns derived using the refined design rules.

43. The method of claim 38, further comprising the step of performing layout processing according to the refined design rules.

44. The method of claim 43, further comprising the steps of:
inputting layout data for the refined design;
analyzing the layout data to sort the layout data into a union of sets of patterns;
extracting patterns within the layout;
building associated pattern instances;
applying a resolution enhancement technique procedure to the pattern instances;
processing each of the pattern instances with at least one parameter identified for that pattern;
merging all of the resultant processed pattern instances to produce output layout data; and
outputting the output layout data;
thereby enhancing the manufacturability of integrated circuit design based on localized application of resolution enhancement techniques to partitions of the refined design layout.

45. The method of claim 44 wherein the input layout data is a design tape-out in the form of a GDS or OASIS file.

46. The method of claim 44 wherein the patterns are selected from among the group of patterns consisting of cell structures, functional blocks, device units, geometry clusters, geometric shapes with certain dimensional properties, shape interactions, layer markers, and user specified areas.

47. The method of claim 44 wherein the step of applying the resolution enhancement technique procedure comprises:
optimizing a phase shift mask procedure based on a pattern category;
creating set-up parameters for each of the pattern instances; and
applying the parameter set to all instances of the pattern category.

48. The system of claim 47 wherein the step of applying a resolution enhancement technique procedure comprises:
optimizing an optical proximity correction procedure for each pattern category; and
applying the optical proximity correction procedure to the resulting parameters for all instances in the pattern category.

49. The method of claim 48, further comprising the step of:
performing a reassessment if the localized patterns for phase shift mask and optical proximity correction do not match.

50. The method of claim 44 wherein the step of applying the resolution enhancement technique procedure comprises:
optimizing an optical proximity correction procedure for each pattern category; and
applying the optical proximity correction procedure to the resulting parameters for all instances in the pattern category.

51. The method of claim 44 wherein the output data is mask-data-preparation-ready layout data.

52. The method of claim 44 wherein the step of analyzing the layout data comprises:
using a design rule associated with the layout data to build a pattern database containing a comprehensive list of geometrical features and interactions that result from a design that may require special treatment;
scanning the layout data to find matches in the database; and
updating the database if a match is not found so that the database can be re-used later for other refined designs employing the same design rule.

53. The method of claim 44 wherein the step of applying the resolution enhancement technique procedure comprises:
providing a knowledge database, built based on prior knowledge and experience, detailed simulation study through comprehensive test pattern matrices, wafer data with test patterns, or prior optimization processes, to store the pattern instances and corresponding optimization results;
scanning the layout data;
comparing output layout patterns against the data stored in the knowledge database;
retrieving the optimized result if a match is found;
performing an optimization if a match is not found;
determining whether or not to store the performed optimization result in the knowledge database; and updating the knowledge database if the determination is to store the performed optimization result.

54. The method of claim 53, further comprising the step of outputting the optimization to a corresponding resolution enhancement technique procedure.

55. The method of claim 54 wherein the resolution enhancement technique procedure is selected from among the group consisting of phase shift mask and optical proximity correction.

56. The method of claim 43, further comprising the steps of:
inputting design layout data for the refined design;
inputting a process model or a set of process models to provide a description of a pattern transfer process for the purpose of manufacturability evaluation;
modeling the input design layout using the process model or the set of process models in order to predict a layout pattern configuration on a wafer;
extracting various manufacturability parameter values from the simulation model;
inputting manufacturability parameter tolerances to specify manufacturing constraints or yield targets;
comparing the extracted manufacturability parameter values and the manufacturability tolerance values;
determining whether or not the manufacturability tolerances are met with respect to the extracted manufacturability parameter values;
storing corresponding locations identified as manufacturability "weak spots" along with associated non-compliance properties, if any manufacturability parameter values are detected to be out of tolerance;
determining the relationship between the non-compliance properties of the "weak spots" and the localized geometrical configuration of layout patterns within a range of influence and generating layout modification instructions and rules;
inputting design rules that are applied in the design of the input design layout;
finding an optimal solution for the manufacturability "weak spots" based on the layout modification instructions and rules; and
outputting an output design layout if the manufacturability tolerances are met or if a predetermined limiting criterion is met;
thereby producing an integrated circuit design having enhanced manufacturability.

57. The method of claim 56 wherein the input design layout data is a design tape-out in the form of a GDS or OASIS file.

58. The method of claim 56 wherein the process model or the set of process models comprises data consisting of data relating to one of the group of a basic optical model; a combination of an optical model with other physical models such as an associated photoresist process, etching, and the like; empirically calibrated process models; an immersion lithography model; an extreme UV lithography model; or a non-optical model.

59. The method of claim 56 wherein the manufacturability parameter values consist of numeric values, such as critical dimensions, image contrast, image log-slope, a mask error enhancement factor (MEEF), depth of focus (DOF), exposure latitude (EL), or more complex quantitative descriptions of manufacturability, such as a process window (PW).

60. The method of claim 59 wherein the manufacturability parameter values are evaluated at discrete evaluation points that have a user- or algorithm-specified, but otherwise arbitrary, granularity, or are described in other more complex quantitative terms, such as contours of printed images, intensity, image slope, and the like, that sufficiently contain pattern printability information.

61. The method of claim 56 wherein the manufacturability parameter tolerances are specified by a user experienced with the manufacturing process or calculated by optimization tools that automatically determine best values for the tolerances.

62. The method of claim 56, further comprising the step of pre-processing and sorting "weak spots" stored within the database after the "weak spots" are identified and captured.

63. The method of claim 62 wherein "weak spots" are sorted based on their properties such as violation type or geometrical or physical configuration.

64. The method of claim 56 wherein an optimal solution for the layout is found based on the relative priorities of the received modification instructions and rules.

65. The method of claim 56 wherein the step of determining the relationship between the non-compliance properties of the "weak spots" and the localized geometrical configuration of layout patterns within a range of influence and generating layout modification instructions and rules comprises:
utilizing manufacturability "weak spot" properties together with localized layout geometrical configuration data to define variables relevant to a given "weak spot;"
defining variable deviation settings sufficient to establish a relationship between non-compliant manufacturability parameters and the layout variables;
calculating on-wafer representations of perturbed layouts based on the process model or the set of process models and the variable deviation settings; and
analyzing the output on-wafer patterns and calculating functional relationships between non-compliant manufacturability parameters and the layout variables.

66. The method of claim 65, further comprising the step of adding assist/dummy features in sparse areas of the layout in order to optimize image interference effects.

67. The method of claim 56 wherein the step of determining the relationship between the non-compliance properties of the "weak spots" and the localized geometrical configuration of layout patterns within a range of influence and generating layout modification instructions and rules comprises:
processing the input design layout, capturing localized properties of the layout, and defining layout variables to provide an extracted pattern;
providing a knowledge database to store reference patterns;
comparing the extracted pattern to the reference patterns stored in the knowledge database; and
fetching the remedial solutions to the given problem and creating instructions, or their logical combinations.

68. The method of claim 67 wherein the knowledge database stores a comprehensive set of problematic patterns and the associated remedial solutions applicable to the relevant design and manufacturing technology.

69. The method of claim 68 wherein the solutions are determined through simulation or obtained experimentally.

70. The method of claim 56, further comprising the step of repeating the modeling and subsequent steps to assure that no additional "weak spots" remain.

71. The method of claim 70, further comprising the step of continuing to iteratively perform the modeling and subsequent steps until there are no "weak spots" remaining or until a predetermined number of iterations is completed.

72. The method of claim 56, further comprising the step of outputting the design layout into a design flow leading to a mask tape-out.

73. The method of claim 43, further comprising the steps of:
- inputting design layout data for the refined design;
- processing the input design layout and capturing localized properties of the layout;
- providing a knowledge database to store reference patterns;
- comparing the extracted pattern to the reference patterns stored in the knowledge database;
- fetching the remedial solutions to the given problem and creating instructions, or their logical combinations;
- finding an optimal solution for the manufacturability based on the layout modification instructions; and
- outputting an output design layout;
- thereby enhancing manufacturability of the integrated circuit design.

74. The method of claim 73 wherein the knowledge database stores a comprehensive set of problematic patterns and the associated remedial solutions applicable to the relevant design and manufacturing technology.

75. The method of claim 74 wherein the solutions are determined through simulation or obtained experimentally.

76. The method of claim 38, further comprising the steps of:
- ascertaining whether further design rule refinement is possible; and
- performing a further analysis and design rule refinement if it is ascertained that the design rule is susceptible to further refinement.

* * * * *